United States Patent [19]

Severinsky

[11] Patent Number: 4,943,902
[45] Date of Patent: Jul. 24, 1990

[54] AC TO DC POWER CONVERTER AND METHOD WITH INTEGRATED LINE CURRENT CONTROL FOR IMPROVING POWER FACTOR

[75] Inventor: Alex J. Severinsky, Silver Spring, Md.

[73] Assignee: Viteq Corporation, Lanham, Md.

[21] Appl. No.: 411,261

[22] Filed: Sep. 25, 1989

Related U.S. Application Data

[63] Continuation of Ser. No. 247,626, Sep. 22, 1988, abandoned, which is a continuation of Ser. No. 123,720, Nov. 23, 1987, Pat. No. 4,816,982.

[51] Int. Cl.$^5$ ............................................. H02M 7/04
[52] U.S. Cl. ...................................... 363/80; 323/285; 323/288; 363/81; 363/89
[58] Field of Search ................... 363/79, 80, 81, 89, 363/44; 323/222, 285, 288

[56] References Cited

U.S. PATENT DOCUMENTS

| | | | |
|---|---|---|---|
| 3,629,622 | 4/1970 | Deneberg, Jr. et al. | 307/297 |
| 3,629,681 | 4/1970 | Gurwicz | 320/21 |
| 3,733,540 | 5/1973 | Hawkins . | |
| 3,913,002 | 10/1975 | Steigerwald et al. . | |
| 3,959,714 | 5/1976 | Mihelich . | |
| 4,074,344 | 2/1978 | Pitel | 363/44 |
| 4,240,134 | 12/1980 | Nakazawa et al. | 363/21 |
| 4,302,717 | 11/1981 | Olla | 363/89 |
| 4,340,931 | 6/1982 | Endo et al. | 363/44 |
| 4,384,321 | 5/1983 | Rippel | 363/124 |
| 4,386,394 | 5/1983 | Kocher et al. | 363/71 |
| 4,437,146 | 3/1984 | Carpenter | 363/21 |
| 4,472,672 | 9/1984 | Pacholok | 363/41 |
| 4,591,963 | 5/1986 | Retotar | 363/17 |
| 4,594,501 | 6/1986 | Culley et al. | 323/288 |
| 4,675,799 | 6/1987 | Suzuki et al. | 363/58 |
| 4,675,800 | 6/1987 | Seki et al. | 363/68 |
| 4,675,802 | 6/1987 | Sugimoto | 363/164 |
| 4,677,366 | 6/1987 | Wilkinson | 363/89 |
| 4,677,535 | 6/1987 | Kawabata et al. | 363/65 |
| 4,677,537 | 6/1987 | Chonan | 363/126 |
| 4,680,689 | 7/1987 | Payne et al. | 363/26 |
| 4,680,692 | 7/1987 | Sakai | 362/35 |
| 4,712,169 | 12/1987 | Albach | 363/89 |
| 4,717,994 | 1/1988 | Diaz et al. | 323/288 |
| 4,719,552 | 1/1988 | Albach et al. | 363/44 |
| 4,816,982 | 3/1989 | Severinsky | 363/80 |

OTHER PUBLICATIONS

Marple, "Low Distortion Three-Phase Power Regulation," vol. 22, No. 3, pp. 970-971, Aug. 1979.
Keller et al., "Unity Power Factor Off Line Switching Power Supplies," 1984, pp. 332-339, CH 2073-5/84/00-00-0332 $1.00 ® 1984 IEEE.
Unitrode Corporation Application Note U-100, "UC3842 Provides Low-Cost Current-Mode Control", pp. 220-231.
Unitrode corporation Application Note U-97, Modelling, Analysis & Compensation of the Current-Mode Converter, pp. 260-265.

*Primary Examiner*—William H. Beha, Jr.
*Attorney, Agent, or Firm*—Banner, Birch, McKie & Beckett

[57] ABSTRACT

An AC to DC power converter comprises an input filter for filtering the alternating current input and an output filter for filtering and smoothing the direct current power output to a load. The output alternating current of the input filter is rectified and electronically switched at a frequency much higher than the frequency of the alternating line current input. The rectified line current is sensed and provided to an integrator circuit whose output provides one control signal input of a pulse width modulator circuit. The pulse width modulator circuit drives the electronic switching an at the same time, provides an output to a discharge circuit for discharging the integrator circuit.

10 Claims, 2 Drawing Sheets

AC TO DC POWER CONVERTER AND METHOD WITH INTEGRATED LINE CURRENT CONTROL FOR IMPROVING POWER FACTOR

This application is a continuation of Ser. No. 247,626, filed Sept. 22, 1988 now abandoned, which is a continuation of 123,720 filed Nov. 23, 1987 U.S. Pat. No. 4,816,982.

BACKGROUND OF THE INVENTION

1. Technical Field

This invention relates to the field of AC to DC power conversion and, more particularly, to such a method and apparatus enabling an improved power factor through integrated line current control.

2. Description of Relevant Art

It is often said that the fundamental challenge of power supply design is to simultaneously realize two conflicting objectives: maximizing the electrical delivery performance of the power supply while at the same time achieving a power supply design of low cost. To this end, control circuitry for AC-DC power converters has evolved which includes a pulse width modulation circuit operated at a frequency much higher than that of the alternating current input. The pulse width modulation circuit in turn activates an electronic switching circuit for switching the rectified line current in accordance with an applied pulse width modulated signal. Such a pulse width modulation circuit is actuated by the result of a comparison of the input voltage waveform and an error signal obtained by subtracting a reference voltage from the voltage delivered to a load of the power supply.

According to the teachings of Pacholok, U.S. Pat. No. 4,472,672, an improved power factor results from forcing the input impedance of such a circuit to appear to be substantially purely resistive. Consequently, while Pacholok is capable of maximizing electrical delivery to a load, he does so at the expense of costly components such as a step-down center tap transformer for input voltage waveform sensing which make the converter uneconomical for practical application.

Retotar, U.S. Pat. No. 4,591,963, discloses a similar technique to that employed by Pacholok in the sense that the input voltage waveform is sensed and a pulse width modulator is controlled responsive to a means for combining the sensed input voltage waveform and the influences of the output voltage waveform delivered to a load upon a reference voltage. What Retotar adds to the technique disclosed by Pacholok is the application of line current sensing techniques for the purpose of constraining current in an input inductor to be in phase with the input voltage waveform. While line current sensing techniques are appropriate for control of peak current, any improvement in electrical power delivery to a load requires the application of substantially the same input line voltage waveform sensing technique as taught by Pacholok.

One problem with input line voltage waveform sensing techniques has been the inability of the control circuitry to react quickly to transients appearing in the line voltage. By the time an input voltage transient is reflected in the load voltage waveform, it is too late for control circuitry to efficiently react.

Nevertheless, the control circuitry itself has evolved to such a state that economical special purpose integrated circuits have been introduced into the market place for application with such voltage control techniques. These low cost integrated circuits facilitate the maximization of electrical power delivery at low cost. For example, the Unitrode Corporation UC 3842 integrated circuit includes in a single chip an oscillator, an error amplifier, a PWM latch or flip-flop and current sensing and limiting circuits at its input. At its output, a control signal may be provided for controlling, for example, the switching transistor of a current mode controlled buck regulator. From the perspective of all such known applications, there still remains a requirement to overcome the fundamental challenge presented above of achieving excellent electrical performance at low cost in an AC to DC converter and to improve transient response.

SUMMARY OF THE INVENTION

It is therefore an overall object of the present invention to provide an AC to DC converter which overcomes the above-noted deficiencies and disadvantages with respect to AC to DC converters known in the prior art.

It is a specific object of the present invention to provide an AC to DC converter which effectively prevents voltage transients and spikes from being propagated to the output load device.

It is another specific object of the present invention to provide an AC to DC converter which presents a substantially purely resistive load to the AC power source in order to achieve a high power factor.

It is a further specific object of the present invention to provide an AC to DC converter having the above advantages which is low in cost and economical to manufacture.

These and other objects of the present invention are achieved by controlling the electronic switching operation of the converter in response to input line current rather than input or output voltage. The waveform presented by the switching current is integrated and sequentially discharged by the same pulse width modulator control circuitry as actuates the switching transistor of the AC to DC power converter. The integrated line current waveform is presented as one input to the pulse width modulator control circuit which is proportional in value to the applied power line current. Another input may be an error signal relating to the difference between the waveform delivered to the load upon a reference voltage. On the other hand, it may be any waveform including an externally provided waveform controlled in amplitude by the output voltage which the input load current is to emulate. In a circuit according to the present invention in which the integrated line current and the load voltage error signal effectuate the two control signal inputs to a PWM control circuit, a power factor of over 95% is achieved. Yet, no input voltage transformer nor its associated high cost is involved. Consequently, the fundamental challenge of maximizing the electrical delivery performance of a power supply while at the same time achieving a power supply design at low cost is fully met by the present invention. Furthermore, as integrated line current, not voltage, is applied for switching control, a faster transient response is accomplished and any influence of the input voltage on the output voltage is totally eliminated.

DETAILED DESCRIPTION

Figure 1:
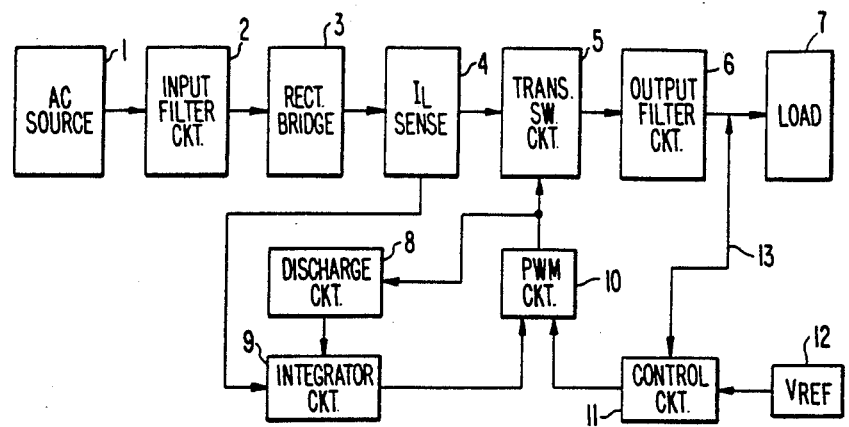
FIG. 1 is a functional block diagram for explaining the principles of operation of an AC to DC converter embodying the principles of the present invention.
Figure 2:
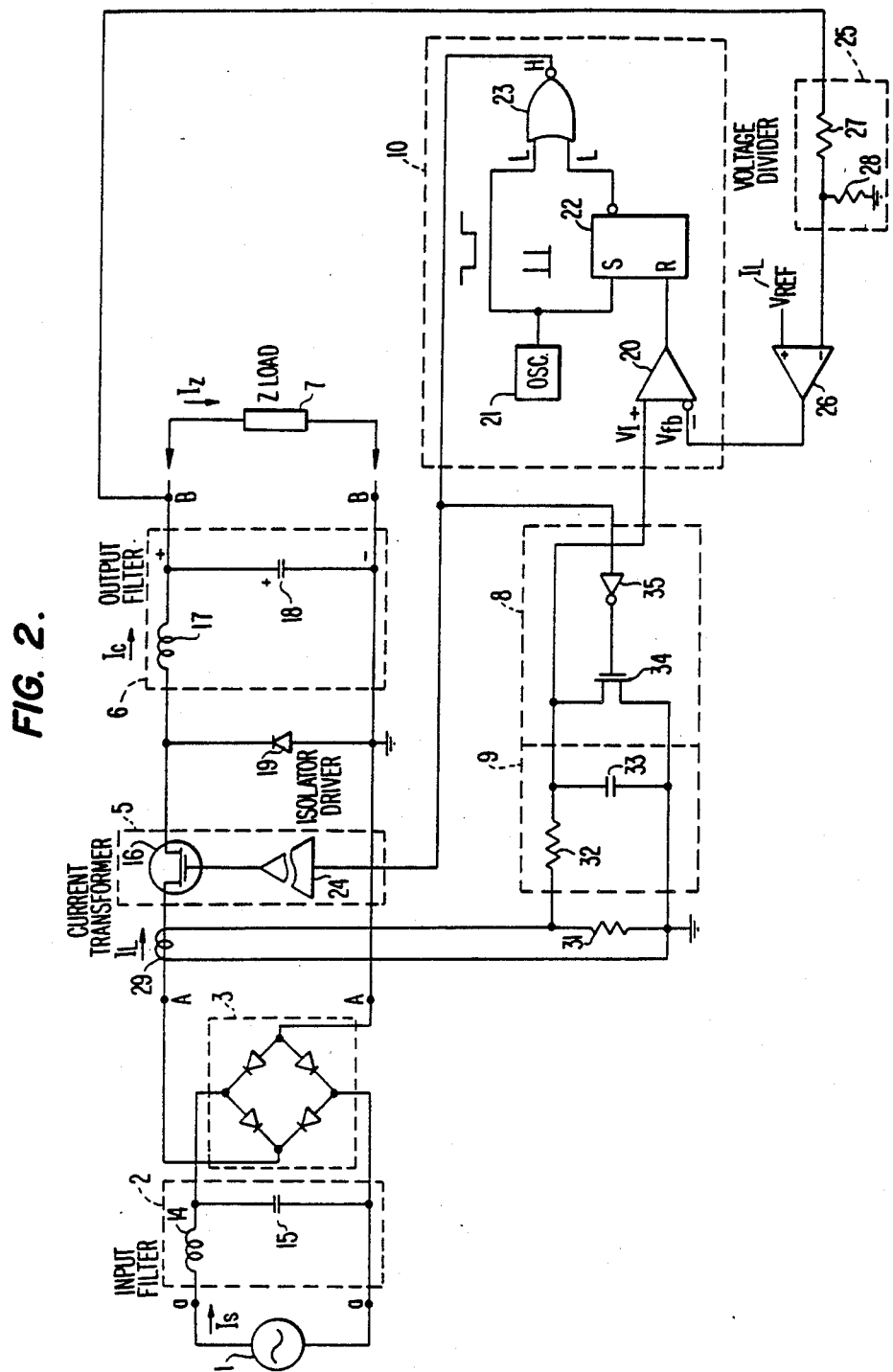
FIG. 2 is a schematic diagram of one embodiment of the present invention in which a substantial power factor improvement is obtained.

For the purposes of the following discussion of the drawings, similar references characters have been used in FIGS. 1–3 to denote similar elements and points in the depicted embodiments. Referring to FIG. 1, there is shown a block diagram of a power supply in accordance with the present invention connected between a source of alternating current 1 and a load 7. In particular, an input filter circuit is coupled to the source 1 of alternating current to smooth the waveform of the current flowing through rectifier bridge 3. The input filter may comprise an L-C lowpass filter with the frequency of the alternating current input, for example, 50 or 60 Hz in the bandpass. Rectifier bridge 3 is provided for converting the alternating current input to a unidirectional current (direct current) and is most conveniently a full wave diode rectifier bridge. Additional filtering is provided by an output filter circuit 6 for delivery of electrical power to load 7.

The present invention distinguishes over known arrangements in the particular implementation of control circuitry 4, 5, 8, 9, 10, and 11. In the present arrangement the rectified line current $I_L$ provided from the source of alternating current 1 is sensed at current sensing circuit 4. Current sensing circuit 4 most conveniently comprises a simple current transformer which has substantially no effect on the amount of power delivered to the load 7. The sensing circuit may additionally comprise a parallel connected resistor, a second diode bridge in parallel with such a resistor or other means for indicating a voltage waveform substantially corresponding to that of the sensed line current.

The sensed line current is in turn provided to integrator circuit 9 which may comprise a capacitor or other means of integrating the sensed waveform. The output of the integrator provides one control signal input to a pulse width modulator circuit 10 which may comprise a Unitrode Corporation UC 3842 integrated circuit, a similar integrated circuit, or discrete components conforming to the circuit details shown in FIG. 2. These internal components include an oscillator, a latch, an input error amplifier and an output logic gate. The one control signal input is provided to one input of the input error amplifier while the other input is provided by control signal circuit 11.

Control signal circuit 11 is provided for generating a second control signal input to PWM circuit 10. Such a control signal input may be an externally generated waveform which it is desired that the input line current track. Consequently, voltage reference source 12 may be a waveform generator. More typically, voltage reference source 12 comprises a source of direct current reference voltage at a particular reference level. In such a situation, line 13 provides a means of obtaining the actual delivered voltage waveform to the load. Control circuit 11 then takes the form of an error amplifier for subtracting the voltage reference level from the actual load voltage waveform to obtain an error signal. The error signal then is delivered to PWM circuit 10.

PWM circuit 10 is operated via the internal oscillator at a frequency much higher than the frequency of the input alternating line current. At its output is provided a signal which both drives transistor switching circuit 5 and actuates a discharge circuit 8. Discharge circuit 8 immediately discharges the voltage signal developed in integrator circuit 9 at the high frequency signal output of PWM circuit 10. Discharge circuit 8 most conveniently comprises a transistor switch for discharging the integrated signal voltage to ground potential.

Transistor switching circuit 5 is also operated by the high frequency output of PWM circuit 10. Circuit 5 particularly comprises one or a stacked circuit of switching transistors depending on the power carrying capabilities required of the transistor circuit. It also comprises an isolating driver amplifier for isolating any effects of the transistor switch from being returned to the PWM circuit 10 or to the discharge circuit 8.

Figure 3A:
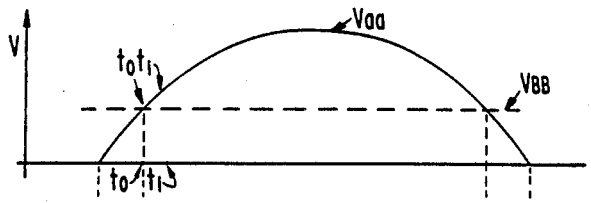
FIGS. 3(a), (b), (c), (d) and (e) show waveforms over time at various points in the AC to DC power converter embodiment of FIG. 2.

Referring to FIG. 2, the integrated line current control technique described above is shown applied to the design of an AC-DC power converter capable of achieving a close to unity power factor and transient free output voltage at low cost. Reference will be made, on occasion, to FIG. 3 in which waveforms are shown at various points in the circuit of FIG. 2. For example, one half of a cycle of input alternating line current voltage $V_{aa}$ is shown in FIG. 3(a) in solid line.

The AC/DC converter of FIG. 2 is formed of a number of component parts. As shown, the converter is powered by AC power source 1 which provides an AC voltage to full wave diode rectifier bridge 3 via an input filter 2 formed of choke coil 14 and capacitor 15. Rectifier bridge 3 rectifies the AC voltage to a unipolar voltage which appears across nodes A—A. The rectified source voltage produces a rectified line current $I_L$ when semiconductor switch 16 is in a conductive state. The on/off state of semiconductor switch 16 is controlled by a signal at its gate electrode as shall be discussed below. When semiconductor switch 16 is in an "on" or conductive state, current $I_L$ flows through switch 16 to an output filter 6 formed of choke coil 17 and capacitor 18. Diode 19 is provided as a return path for any EMF generated by choke coil 9 when semiconductor switch 16 switches to an off or non-conductive state. The output filter provides a filtered DC voltage across nodes B—B which produces load current flow $I_Z$ through load 7.

The circuit elements shown in blocks 5, 8, 9 and 10 of FIGS. 1 and 2 control the operation of the AC/DC converter as shall be discussed below in connection with the waveforms shown in FIG. 3, which is also attached.

Block 10 is the pulse width modulation (PWM) control block which includes PWM comparator 20, oscillator 21, flip-flop 22 and NOR gate 23. Oscillator 21 operates PWM control circuit 10 at a much higher frequency than the input alternating line current frequency, for example, at 50,000 $H_Z$. Referring briefly to FIG. 3(a) at a point in time $t_o$, the outputs of oscillator 21 and flip-flop 22 provide a logic LO level signal to the respective inputs of NOR gate 23. Thus, the output of NOR gate 23 is a logic HI. The logic HI signal is provided to the gate of semiconductor switch 16 through non-inverting isolating driver 24. Thus, switch 16 is rendered to a conductive state. At the same point in time, a cycle of the AC source voltage begins to rise from its reference level $V_{BB}$ as shown by waveform $V_{aa}$ in FIG. 3(a). A certain level DC output voltage waveform will also be present across nodes B—B. This voltage is maintained even when semiconductor switch 16 is in a non-conductive state due to the action of output filter capacitor 18. This voltage is supplied to load 7 and causes current $I_Z$ to flow through load 7. The voltage at node B—B is also supplied to error voltage divider 25. Voltage divider 25 provides an error voltage to error amplifier 26. Voltage divider 25 comprises resistors 27 and 28 which provide a divided or scaled-down voltage to the inverting input of error amplifier 26. Error amplifier 26 compares this scaled-down voltage Vref to a desired reference constant voltage source 12. Voltage Vref corresponds to a predetermined level of the voltage across nodes B—B. Error amplifier 26 provides a difference or error signal voltage $V_{fb}$ to the inverting input of comparator 20 of PWM circuit 10.

The rectified line current $I_L$ is detected by current transformer 29 which is coupled to resistor 31. Alternatively, a diode bridge may be used in place of resistor 31 in order to ensure correct polarity of the current from transformer 29. A corresponding voltage signal is produced across resistor 31 which is supplied to an integrator 9 formed of resistor 32 and capacitor 33. Thus, capacitor 33 begins to charge at time $t_o$ because transistor 21 is presently in an off state due to the logic HI at the output of NOR gate 15 and the logic LO at the output of inverter 22. The integrating voltage $V_I$ across capacitor 33 is illustrated by the waveform in FIG. 3(b). Integrated voltage $V_I$ is supplied to the non-inverting input of PWM comparator 20 where its level is compared to the level of feedback voltage $V_{fb}$. When the level of $V_i$ exceeds the level of $V_{fb}$ at time $t_1$, the output of comparator 20 changes from a logic LO to a logic HI which resets flip-flop 22, thus causing the output of NOR gate 23 to change to a logic LO. The logic LO signal is supplied to the gate electrode of semiconductor switch 16, causing the switch to turn off and interrupt the current flow from source 1. The logic LO from the output of NOR gate 23 is also supplied to the input of inverting driver 35 which causes transistor 34 to turn on, discharging capacitor 33.

When semiconductor switch 16 turns off and the source of current is interrupted, the EMF generated by the magnetic field collapsing around choke coil 14 produces a continued current flow to capacitor 15. This current flow causes capacitor 15 to continue to charge. This flow of current is illustrated by the waveform in FIG. 3(d). Choke coil 17 produces a similar current flow when its magnetic field collapses causing a continued current flow to capacitor 18 and load 7.

The above described operation repeats itself when the output of oscillator 21 once again returns to a LO logic level.

Figure 3B:
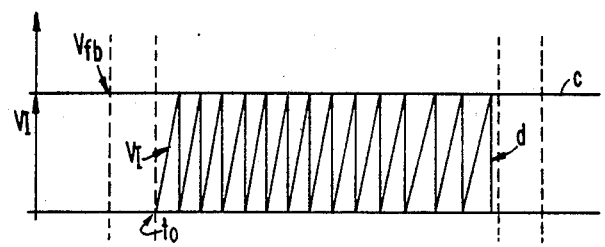

Referring again to FIG. 3(a), the control circuit of the present invention is not actuated until time $t_1$ when the normally closed transistor switch 16 permits a load voltage $V_{BB}$ to develop across load 7. Referring to FIG. 3(b), voltage $V_I$ begins to accumulate at time $t_o$ on capacitor 33. Upon reaching level $V_{fb}$ at comparator 20 at time $t_1$, the discharge circuit transistor 34 is actuated discharging capacitor 33 which stores the value of the integrated line current $V_{jl}$. As PWM circuit 10 is clocked at a high frequency in comparison with the frequency of the alternating line current input $I_s$, there are shown in FIG. 3(b) several ramp increases of voltage $V_I$ and discharges until $V_{aa}$ falls below $V_{BB}$ as shown in FIG. 3(a).

Figure 3C:
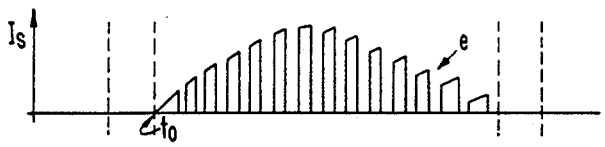

Referring to FIG. 3(c), there is shown the resulting current $I_s$ through input choke coil 14 from the switching action of transistor 16 driven by PWM circuit 10. When the normally closed transistor switch 16 opens after $V_{BB}$ is reached at time $t_0$ there is periodically generated a current which increases until it is allowed to flow through the repeated closing of switch 16. A series of forward pointing steps results as shown in FIG. 3(c).

Figure 3D:
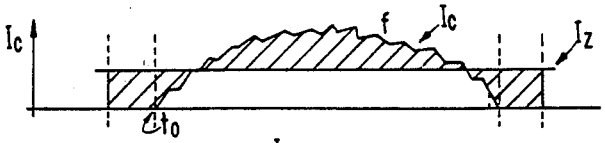
Figure 3E:
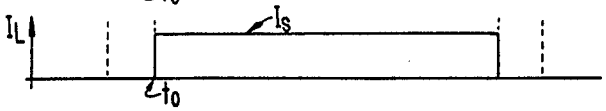

Meanwhile, as shown in FIG. 3(d), the switching transistor 16 has the effect on the resulting current $I_c$ through output choke coil 17 of creating a jagged sinusoidal waveform as shown. In FIG. 3(d), it is also shown that the waveform of FIG. 3(c) having resulted in the enhanced, jagged $I_c$ waveform of FIG. 3(d) results in an averaged constant current $I_Z$ delivered to the load 7, (the shaded area above the $I_z$ line supplementing the shaded area below the $I_z$ line.) Referring to FIG. 3(e) averaged source current $I_S$ is shown as provided from alternating current source 1. An improved power factor approaching unity can result from the integrated line current control technique of the present invention.

The foregoing embodiment of FIG. 2 is intended as an illustration of one application of the integrated line current control technique first introduced in the discussion of FIG. 1. Other modifications and embodiments will be apparent to one skilled in the art without departing from the spirit and scope of the principles of the present invention.

I claim:

1. A power converter for converting alternating line current provided at an input to direct current delivered at an output of the power converter comprising
    filtering means for filtering the input alternating line current,
    rectifying means responsive to the input current filtering means for rectifying the filtered input line current,
    direct current control means, operated at a substantially higher frequency than the frequency of the input alternating line current, for controlling the direct current delivered to the output of the power converter, the direct current control means particularly comprising current switching means for switching the filtered and rectified line current at high frequency and a control circuit for providing a control signal output for controlling the current switching means and an integrating means,
    line current sensing means, responsive to an output of the current rectifying means, for sensing the filtered and rectified line current and
    the integrating means responsive to the line current sensing means and to the control signal output of the control circuit of the direct current control means for integrating the sensed line current and for providing a first control signal input to the control circuit of the direct current control means.

2. The power converter in accordance with claim 1 said integrating means including capacitor means for storing said sensed line current and discharge means, responsive to the control signal output of the direct current control means, for discharging said capacitor means.

3. The power converter in accordance with claim 1 further comprising
    second control signal providing means coupled to the output of the power converter for providing a second control signal input to the control circuit of the direct current control means.

4. The power converter in accordance with claim 3 wherein
the second control signal providing means particularly comprises a source of DC reference voltage for comparison with a voltage waveform developed at the output of the power converter.

5. The power converter in accordance with claim 1 further comprising
second control signal providing means coupled to a reference voltage source for providing a second control signal input to the direct current control means.

6. The power converter in accordance with claim 1 wherein
the control circuit of the direct current control means particularly comprises pulse width modulating means, responsive to the integrating means, for providing the control signal output for controlling the current switching means and the integrating means, the control signal output being a pulse width modulated control signal.

7. The power converter in accordance with claim 1 wherein the line current sensing means detects the filtered and rectified line current and provides a corresponding voltage signal to the integrating means.

8. A method of converting alternating line current provided at an input to direct current delivered at an output of a power converter circuit comprising the steps of
filtering the input alternating line current,
rectifying the filtered line current and providing a rectified line current output,
switching the rectified line current output at a rate much higher than the frequency of the input alternating line current,
sensing the rectified line current output,
integrating the sensed line current to provide a first control signal,
providing an error control signal related to the desired waveform of the direct current output of the power converter, and
controlling the switching of the rectified line current output and simultaneously discharging the integrated line current, the line current switching control step being responsive to the first control signal of the line current integration step and to the error control signal.

9. The method of alternating to direct current conversion of claim 8 comprising the additional steps of
sensing the output voltage delivered at the output of the power converter and
subtracting a predetermined reference voltage from the sensed output voltage, the error control signal of the error control signal providing step being the difference between the sensed output voltage and the predetermined reference voltage.

10. The line current converting method of claim 8 wherein the filtered and rectified line current is detected during the sensing step and a corresponding voltage signal is integrated during the integration step.

* * * * *